UNITED STATES PATENT OFFICE.

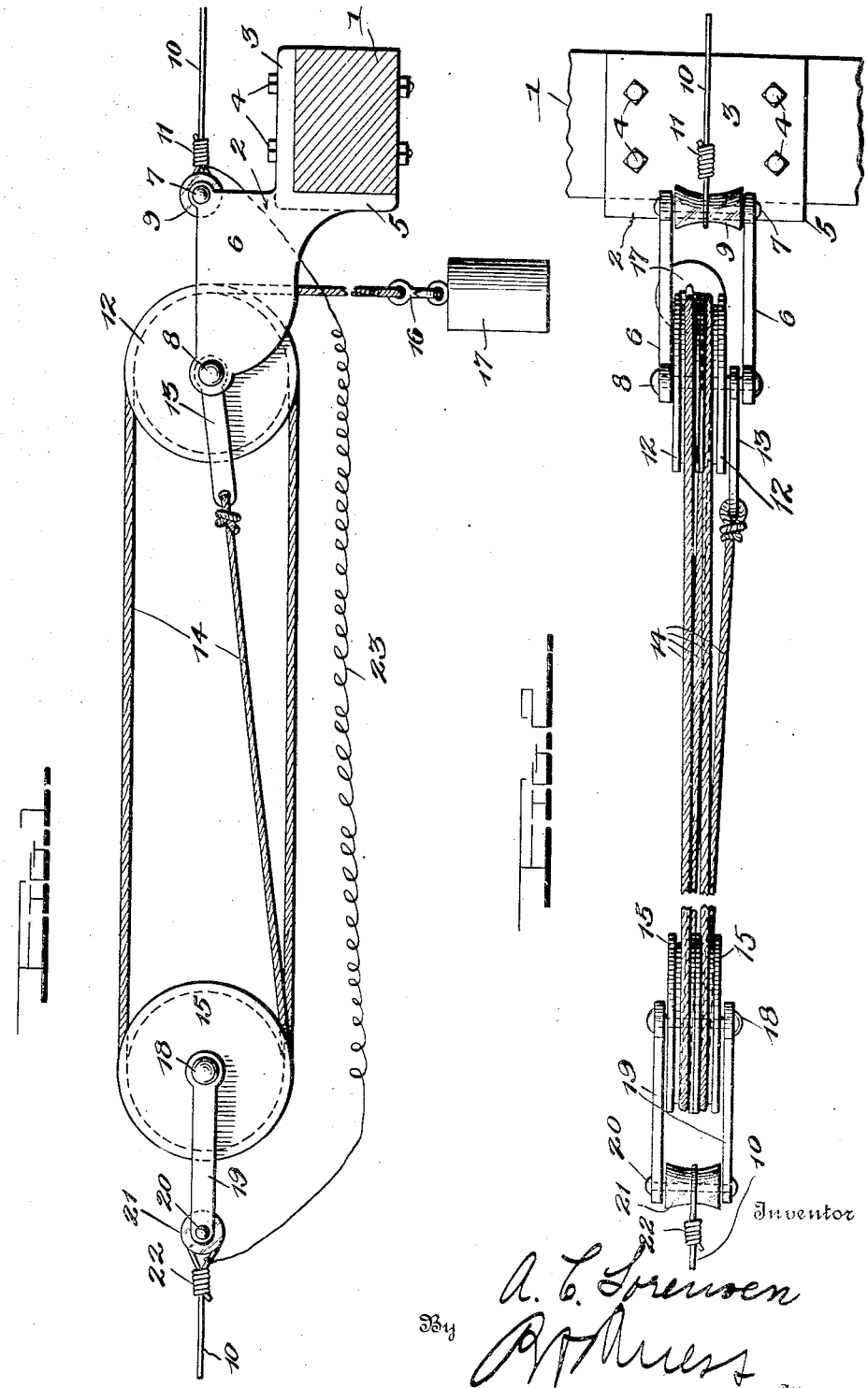

ARVID C. SORENSEN, OF WEBSTER, NORTH DAKOTA.

COMPENSATING DEVICE FOR LINE-WIRES.

1,205,281.  Specification of Letters Patent.  Patented Nov. 21, 1916.

Application filed April 1, 1916. Serial No. 88,413.

*To all whom it may concern:*

Be it known that I, ARVID C. SORENSEN, a citizen of the United States, residing at Webster, in the county of Ramsey and State of North Dakota, have invented certain new and useful Improvements in Compensating Devices for Line-Wires, of which the following is a specification.

This invention relates to certain new and useful improvements in a compensating device for line wires and is especially adapted for compensating the length of telephone and telegraph wires in extreme weather conditions to prevent the wires from breaking.

The objects are to provide such a device which will efficiently operate to maintain the line wire taut, one which employs no springs to wear out, and one which will be of simple, durable and practical form to enable the manufacture thereof at a reasonable cost.

The invention further resides in the features of construction and arrangement of parts hereinafter described and claimed and while it is capable of embodiment in numerous forms, the preferred form is illustrated in the accompanying drawings wherein—

Figure 1 is a side elevation of the device in practice; and Fig. 2 is a fragmentary top plan view thereof.

Referring more in detail to the drawings, the numeral 1 designates the usual cross bar on the telegraph or telephone pole, and 2 a bracket having a right angular base which has its horizontal part 3 secured to the upper face of the bar by bolts 4 and its vertical part 5 bearing against a vertical face of the bar to support and reinforce the bracket. Extending outwardly from the angle of the base is a pair of spaced plates 6, the rear edges of which rise vertically in line with the base part 5 and are connected at the upper corner by a bolt 7. From this bolt, the edges of the plate extend forwardly in a horizontal plane to a second bolt 8 which also serves as a sustaining spacer between the plates. The plates extend downwardly on the vertical part 5 and thereby considerable weight is placed on this reinforcement.

Journaled on bolt 7 between the plates 6 is an insulator 9, preferably glass, to which the line wire 10 is secured as shown at 11. By this position of the insulator the strain on the bracket between the two lengths of the line wire is practically equalized. A pair of pulleys or grooved wheels 12 are journaled on the bolt 8 and on the latter between the pulley and a side plate 6 is swingingly mounted an arm or link 13 which extends beyond the periphery of the pulley. One end of a cable, or other flexible member, 14 is anchored to the free end of the link 13 and after passing about pulleys 12 and a second pair of pulleys 15 the opposite end of the cable is terminated in a hook 16 which supports a weight 17. The pair of pulleys 15 are journaled on a bolt 18 which connects a pair of bars 19 at one end while a second bolt 20 connects the bars at the opposite ends and forms a support for an insulator 21 to which the line wire 10 is connected as depicted at 22. Sufficient slack, as at 23, is provided in the line wire between its points of connection with the insulators 9 and 21 to permit of the cable 14 running out under excessive strains which are frequently placed upon the line wires in cold weather as well as under other conditions. Thus, it will be seen that instead of the wires breaking, the compensating device will "pay out" the required length of wire and when the conditions return to normal again, the weight 17 will "take in" the extra slack and always maintain the line wire taut.

What is claimed is:

1. In a device of the character described, a bracket having a right angular base adapted to seat on the usual cross bar of a telephone pole, said bracket including a pair of spaced parallel plates extending from the corner of the base with their rear edges rising vertically therefrom; a pair of spacing bolts connecting the plates, a pair of pulleys on one bolt, a link on the latter, an insulator on the other bolt, a second pair of pulleys spaced from the first pair of pulleys, a pair of bars supporting the second pair of pulleys therebetween, an insulator arranged between the bars, said insulators being adapted to have the line wire connected thereto in a manner to leave slack between the insulators, a cable fixed at one end to the link and passing over the pulleys, and a weight attached to the other end of the cable.

2. In a device of the character described, a fixedly mounted bracket, a pulley journaled thereon, a suspended pulley, a cable having one end anchored to the bracket and passing about the pulleys so as to have its opposite terminal freely hanging from the first pulley, a weight connected to the free end of the cable, and means connecting the first bracket and second pulley at spaced points to a line wire so as to provide a slack section therebetween.

In testimony whereof I affix my signature.

ARVID C. SORENSEN.